United States Patent
Goto

[11] Patent Number: 5,889,273
[45] Date of Patent: Mar. 30, 1999

[54] WIRELESS COMMUNICATION DATA STORING MEDIUM FOR RECEIVING A PLURALITY OF CARRIERS OF PROXIMATE FREQUENCIES AND A TRANSMISSION/RECEIVING METHOD

[75] Inventor: Yuichi Goto, Hadano, Japan

[73] Assignee: Kabushiki Kaisha Toshiba, Kawasaki, Japan

[21] Appl. No.: 715,465

[22] Filed: Sep. 18, 1996

[30] Foreign Application Priority Data

Sep. 19, 1995 [JP] Japan ................................. 7-240271

[51] Int. Cl.$^6$ .................................................. G06K 19/06
[52] U.S. Cl. ...................... 235/492; 235/380; 340/825.54
[58] Field of Search .................................. 235/492, 380, 235/449, 487; 340/825.54, 825.34

[56] References Cited

U.S. PATENT DOCUMENTS

| | | | |
|---|---|---|---|
| 4,388,524 | 6/1983 | Walton | 235/380 |
| 4,546,241 | 10/1985 | Walton | 235/380 |
| 4,797,541 | 1/1989 | Billings et al. | 235/449 |
| 4,814,595 | 3/1989 | Gilboa | 235/492 |
| 4,918,416 | 4/1990 | Walton et al. | 235/492 X |
| 5,013,898 | 5/1991 | Glasspool | 235/449 |
| 5,326,965 | 7/1994 | Inoue | 235/492 |
| 5,349,173 | 9/1994 | Scheckel et al. | 235/492 |
| 5,362,954 | 11/1994 | Komatsu | 235/492 |
| 5,418,353 | 5/1995 | Katayama et al. | 235/380 |
| 5,418,358 | 5/1995 | Bruhnke et al. | 235/492 |
| 5,436,441 | 7/1995 | Inoue | 235/487 |
| 5,550,536 | 8/1996 | Flaxl | 340/825.54 |

FOREIGN PATENT DOCUMENTS

| | | |
|---|---|---|
| 0 309 201 A2 | 9/1988 | European Pat. Off. . |
| 0-502-518-A2 | 9/1992 | European Pat. Off. . |
| 0 694 887 A1 | 7/1995 | European Pat. Off. . |
| 0 706 151 A2 | 10/1995 | European Pat. Off. . |
| 41 00 693 A1 | 7/1991 | Germany . |
| 4-127291 | 4/1992 | Japan . |
| WO 88/00785 | 1/1988 | WIPO . |

Primary Examiner—Michael G. Lee
Attorney, Agent, or Firm—Pillsbury Madison & Sutro LLP

[57] ABSTRACT

A wireless communication data storing medium capable of effectively receiving carrier waves of different frequencies proximate to each other. A composite wave of a first carrier for supplying a source voltage and a second carrier for transferring data is received by a circuit. The composite wave is rectified to generate the source voltage, which is supplied to the internal circuits of the medium from a circuit. On the basis of the composite wave, an amplitude change corresponding to the data transferred by the second carrier is detected by a circuit. The data is extracted by a circuit on the basis of the amplitude change.

14 Claims, 4 Drawing Sheets

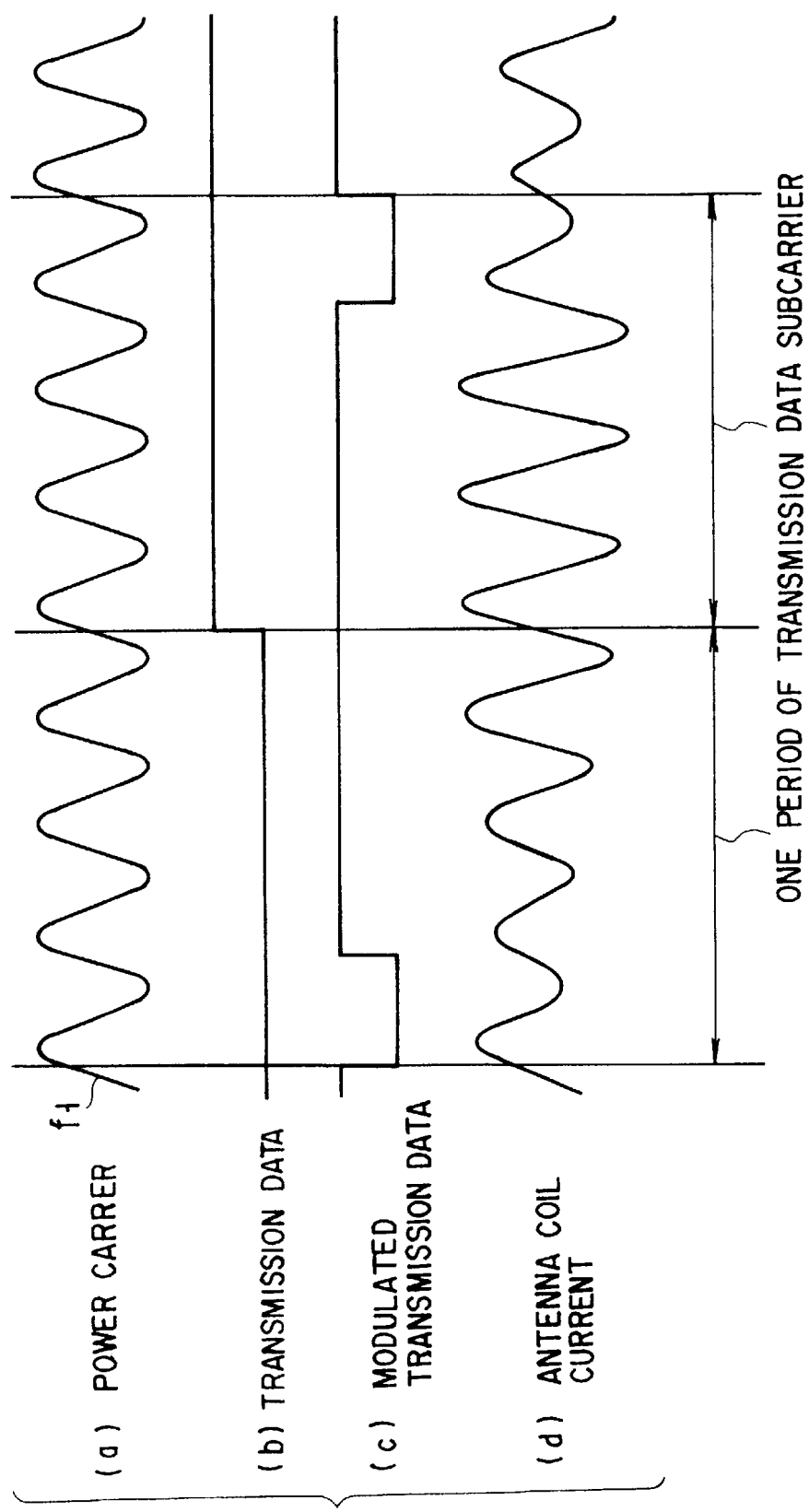

WIRELESS COMMUNICATION DATA STORING MEDIUM FOR RECEIVING A PLURALITY OF CARRIERS OF PROXIMATE FREQUENCIES AND A TRANSMISSION/ RECEIVING METHOD

BACKGROUND OF THE INVENTION

1. Field of the Invention

The present invention relates to a wireless communication data recording medium such as a wireless communication IC card supplied with power in a wireless manner using a radio wave for transmitting and receiving data, and a method of data transmission.

2. Description of the Related Art

In recent years, in order to improve the reliability of the IC cards as a data storing medium, a wireless communication IC card has been proposed for transmitting and receiving data and power in a wireless manner using a radio wave. Such a wireless communication IC card (hereinafter referred to simply as "the IC card") has two antennas built therein for receiving two different carriers transmitted using two radio waves of different frequencies, one for supplying power and the other for transmitting data modulated by the PSK (Phase Shift Keying) modulation scheme, for example. In the process, in order to prevent the power carrier from having an effect on the data transmission, the frequencies of the two carrier waves are sufficiently separated from each other or a filter of a large attenuation is inserted for removing the power carrier from the data carrier.

As described above, the conventional IC card is required to have two antennas, one for receiving a power carrier and one for a data transmission carrier. Also, a filter is required for removing the effect of the power carrier on the data carrier. The result is a number of components having a time constant of an analog circuit, so that it is difficult to configure the circuit on semiconductor integrated circuits (introduction of LSI). This in turn makes it difficult to reduce the circuit size on the one hand and to realize a small package on the other hand.

SUMMARY OF THE INVENTION

The object of the present invention is to provide a wireless communication data storing medium in which a carrier for supplying power and a carrier for transmitting data are received, and data can be transmitted and received stably without any filter, even in the case where the two carriers are proximate to each other, and a method of wireless communication power-data transmission method.

According to one aspect of the present invention, there is provided a wireless communication data storing medium comprising means for receiving a composite wave of a first carrier for supplying a source voltage and of a second carrier for transferring data, means for generating the source voltage by rectifying the composite wave and supplying the rectified source voltage to the internal circuits of the wireless communication data storing medium, means for detecting an amplitude change corresponding to the data transferred by the second carrier on the basis of the composite wave, and means for extracting the data on the basis of the amplitude change detected by the detection means.

In this aspect of the invention configured as described above, the power-supplying carrier and the data-transfer carrier oscillated from a card reader-writer can be received by the same receiving system. In other words, the circuit size can be reduced for a lower cost without using any two independent antennas or any filter for removing the effect of the power carrier on the data transfer carrier as required in the prior art.

According to another aspect of the invention, there is provided a wireless communication data storing medium in which the detection means includes means for comparing the amplitude of a subcarrier based on the envelope of the composite wave with the average amplitude of the subcarrier in synchronism with the first carrier thereby to detect the amplitude change corresponding to the data.

With the above-mentioned configuration of the invention, even in the case where the frequencies of the first and second carriers are proximate to each other, the data of the second carrier can be demodulated stably without being affected by the first carrier. More specifically, in the case where the frequencies of the first and second carriers are proximate to each other, the subcarrier B based on the envelope of the composite wave A assumes a waveform proximate to the received wave A under the effect of the composite wave A. As a result, in the case where the subcarrier B is compared with the average E to detect the amplitude change C corresponding to the transferred data G, the result is undesirably different partially from the transfer data G (operating error) (See x and y in FIG. 3). This is by reason of the fact that when the frequencies of the first and second carriers come to approach each other, the subcarrier B assumes a waveform infinitely approaching the received wave.

The comparison between the subcarrier B and the average E at a timing free of the effect of the first carrier on the envelope, however, is possible if the subcarrier B is compared with the average E in synchronism with the first carrier f1 (See z in FIG. 3). More specifically, the comparison between the subcarrier B and the received wave A is not made at time point x or y shown in FIG. 3, but only at the rise time of a clock signal D at point z. As a result, even when the first carrier f1 and the second carrier f2 are set at frequencies considerably proximate to each other, no operating error is caused when the two radio waves are received as a composite wave A by the same antenna without any filter. Consequently, a wireless communication data storing medium with a simple configuration is realized in which a plurality of carriers having frequencies proximate to each other can be transmitted and received stably without any filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated herein and constitute a part of the specification, illustrate presently preferred embodiments of the invention and, together with the general description given above and the detailed description of the preferred embodiments given below, serve to explain the principles of the invention.

FIG. 4 shows a waveform for explaining the operation of the essential parts of the IC card for transmitting data to a card reader-writer from the IC card.

DETAILED DESCRIPTION OF THE PREFERRED EMBODIMENTS

An embodiment of the invention will be described below with reference to the accompanying drawings.

Figure 1:
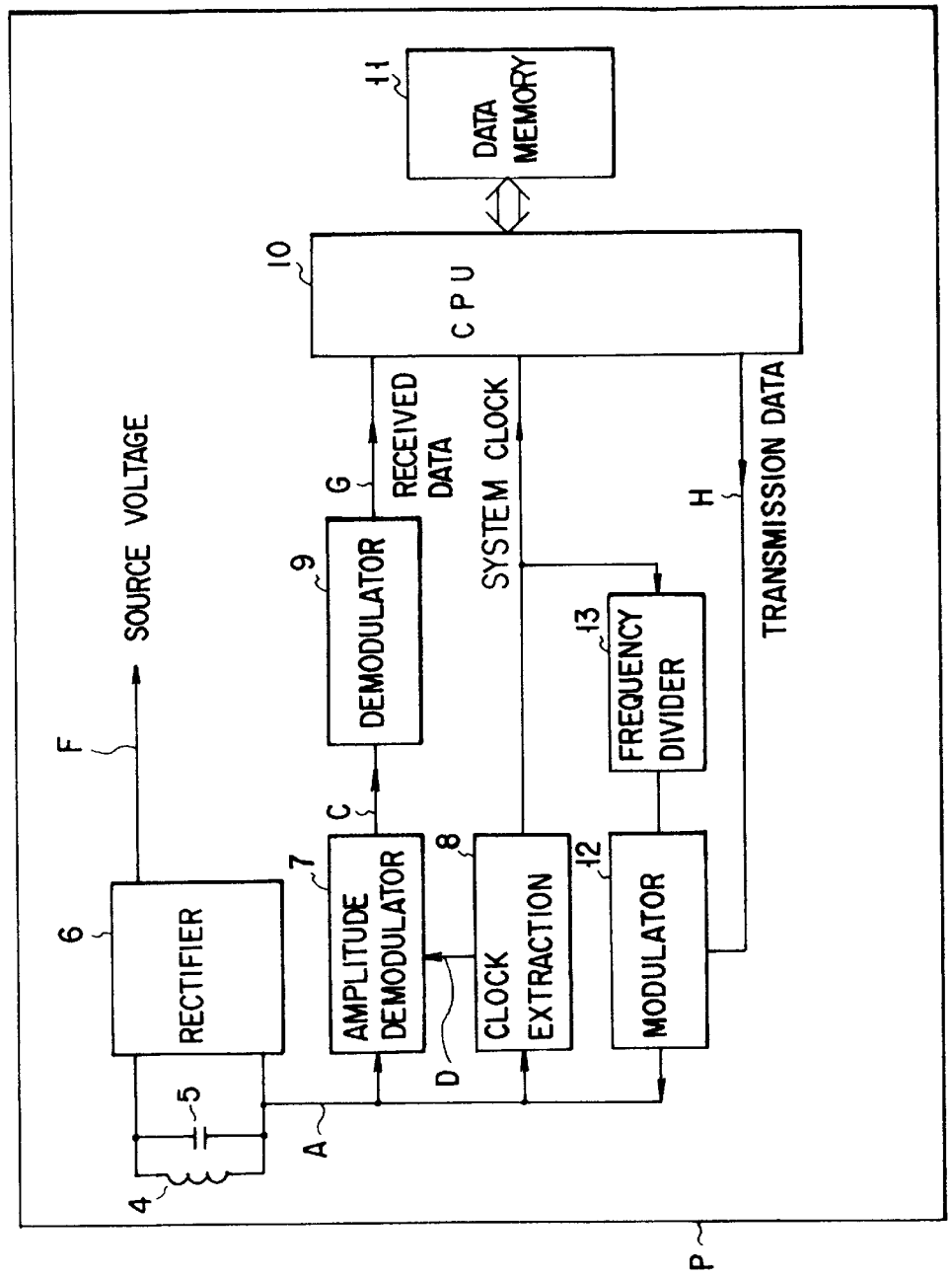
FIG. 1 is a block diagram schematically showing a configuration of a wireless communication IC card constituting a wireless communication data storing medium according to an embodiment of the present invention.

FIG. 1 schematically shows a configuration of a wireless communication IC card constituting a wireless communication data storing medium according to the present invention.

In FIG. 1, a non-modulated power-supplying carrier f1 (power carrier) emitted from a power carrier transmission antenna 1a installed in a card reader-writer 1 and a PSK-modulated data signal carrier f1 (data carrier), for example, emitted from a data transmit-receive antenna 1b are transmitted to a wireless communication IC card (hereinafter referred to simply as "the IC card") P.

The card reader-writer 1 is connected with a host computer 3 through a communication line 2 and adapted to operate under the control of the host computer 3. More specifically, when the card reader-writer 1 receives a data signal from the IC card P, the data signal is demodulated and the resulting data is transmitted through the communication line 2 to the host computer 3. Then, the host computer 3 processes the data variously. Also, the transmission data from the host computer 3 is transmitted to the card reader-writer 1 through the communication line 2. The card reader-writer 1 receives the transmission data, which is PSK-modulated, for example, and the carrier is transmitted to the IC card P. The power carrier has a great energy for supplying power F consumed in the IC card. The data carrier, on the other hand, is for supplying a smaller energy than the power carrier.

When the high-frequency electromagnetic field of the two carriers f1, f2 generated from the antennas 1a, 1b of the card reader-writer 1 is applied to an antenna coil 4 in the IC card P, a resonator circuit including the antenna coil 4 and a capacitor 5 develops an AC induction voltage and an AC induction current of a composite wave of the data carrier and the power carrier due to the electromagnetic induction.

This resonator circuit is connected to a rectifier circuit 6, in which the AC voltage is rectified into a DC voltage. Further, the DC voltage is regulated to a constant level thereby to supply a source voltage F for the IC card P.

The composite wave A (hereinafter referred to as "the received wave") of the data carrier and the power carrier received by the antenna coil 4 is applied to an amplitude demodulator circuit 7 and a clock extraction circuit 8.

The amplitude demodulator circuit 7 detects the subcarrier B constituting the amplitude variations of the power carrier extracted at a frequency equal to the sum or difference between the two carriers f1, f2 contained in the composite wave A, and thus outputs a received modulation data on the basis of the subcarrier B.

The received modulation data C output from the amplitude demodulator circuit 7 is applied to a demodulator circuit 9, where the PSK-modulated received data G, for example, is demodulated and output.

The clock extraction circuit 8 extracts a clock signal D of the same frequency as that of a power carrier synchronous with the power carrier f1 contained in the composite wave, and outputs the same signal as a system clock used in the IC card.

A CPU 10 reads the received data G from the demodulator circuit 9 in accordance with the timing of the system clock signal D supplied by the clock extraction circuit 8, and processes the data stored in a data memory 11 as predetermined. The CPU 10 also is adapted to output transmission data H to the card reader-writer 1 as required. In the case where data is transmitted from the IC card P to the card reader-writer 1, the transmission data H is sent to the modulation circuit 12 under the control of a CPU 10.

The modulation circuit 12 subjects the transmission data to PSK-modulation, for example, at a frequency (the same frequency as the subcarrier) obtained by dividing the system clock signal by a frequency divider 13 at a predetermined frequency-dividing ratio, and modulates the frequency signal in phase with the power carrier in accordance with the modulated data. In this way, the load current of the resonator circuit, including the antenna coil 4 and the capacitor 5, is changed thereby to generate a radio wave of the same frequency component as the data carrier f2 from the antenna coil 4.

This radio wave is received by the data transmission antenna 1b arranged in a manner not to be coupled with the power carrier transmission antenna 1a in the card reader-writer 1, and is output in the form of the power carrier amplitude-modulated by the subcarrier. The subcarrier is extracted by the same process as in the amplitude modulation circuit 7 of the IC card P. The data from the subcarrier is demodulated, and in this way, the transmission data H from the IC card P can be easily received.

The foregoing description concerns the case in which the phase relation between the data carrier and the power carrier is moved for PSK (phase shift keying) modulation. The invention, however, is not limited to such a case, but the amplitude shift keying (ASK) modulation can be carried out on the subcarrier by turning on and off the data carrier, or the frequency shift keying (FSK) modulation can be performed by changing the frequency relation between the data carrier and the power carrier. In the description that follows, the PSK (phase shift keying) modulation is taken as an example.

Figure 2:
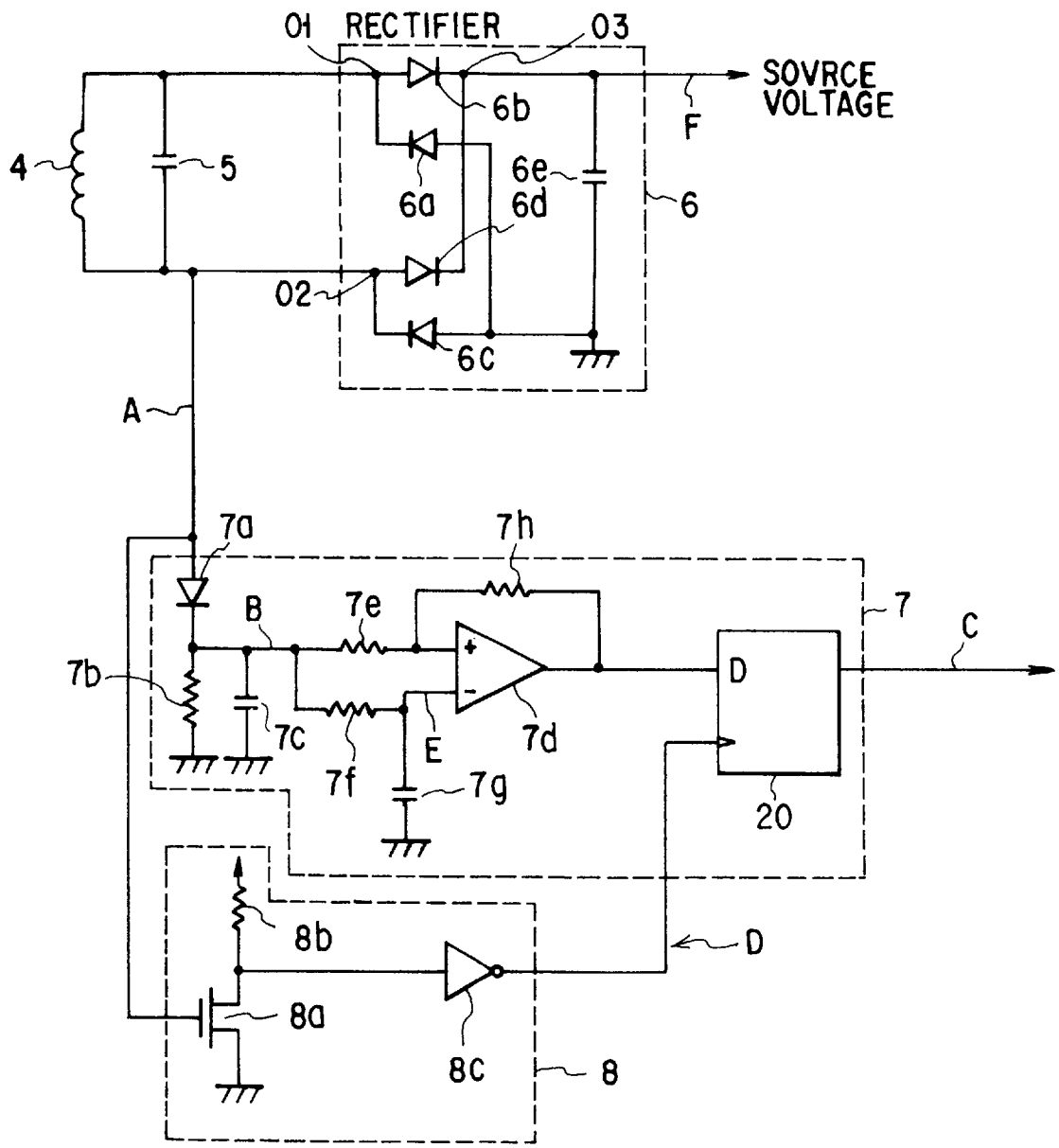
FIG. 2 is a diagram showing a specific example of a circuit configuration of the essential parts of the IC card shown in FIG. 1.
Figure 3:
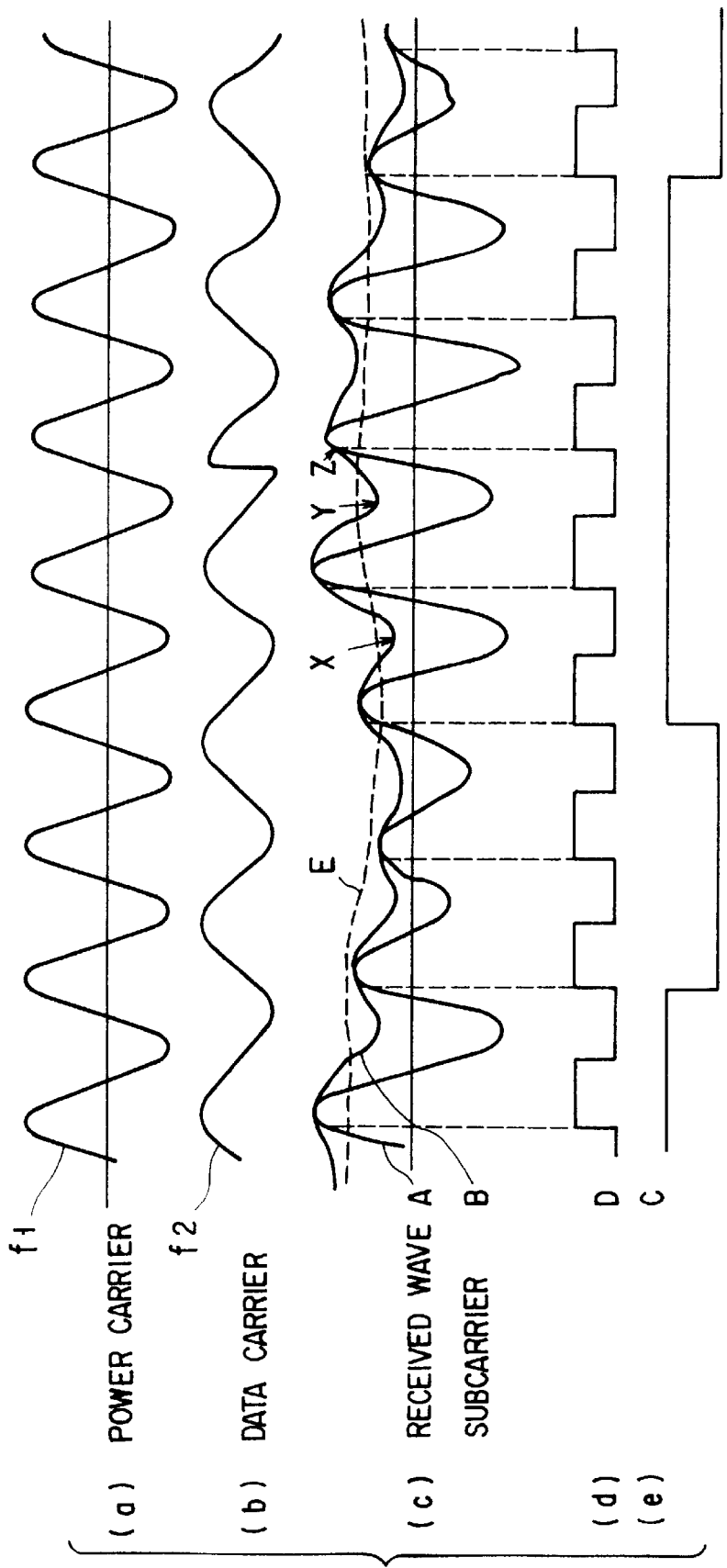
FIG. 3 shows a waveform for explaining the operation of the circuit configured as shown in FIG. 2.

Now, a specific example of the circuit configuration of the essential parts of the IC card P will be explained with reference to FIGS. 2 and 3. FIG. 3 shows a signal waveform for explaining the operation of the circuit configured as shown in FIG. 2.

The rectifier circuit 6, which is the one most extensively used at present, is a bridge rectifier circuit including four diodes 6a, 6b, 6c, 6d configured in a bridge. More specifically, an end of a coupling coil 4 is connected to the junction point 01 between the cathode of the diode 6a and the anode of the diode 6b, and the other end of the coupling coil 4 is connected to the junction point 02 between the cathode of the diode 6c and the anode of the diode 6d. When a high-frequency radio wave is applied to the antenna coil 4, the AC voltage output thereof is rectified by the bridge rectifier circuit 6. A DC voltage thus is obtained from the junction point 03 between the cathode of the diode 6b and the cathode of the diode 6d. The junction point between the anode of the diode 6a and the anode of the diode 6c is grounded. The DC voltage obtained from the junction point 03 is stabilized by the capacitor 6c thereby to supply a predetermined source voltage F.

Assume that the power carrier f1 ((a) of FIG. 3) and the data carrier f2 ((b) of FIG. 3) are emitted from the antennas 1a and 1b of the card reader-writer 1. FIG. 3 shows the case in which the frequency of the data carrier f2 is three-fourths that of the power carrier f1 and the data carrier is phase-modulated at 180° according to the changes of the data.

When the electromagnetic field of the two carriers f1, f2 having these waveforms is applied to the antenna coil 4 in the IC card P, an AC induction voltage and an AC induction current of a composite signal of the data carrier f1 and the power carrier f2 are generated due to the electromagnetic induction in the resonator circuit including the antenna coil 4 and the capacitor 5. This composite wave, i.e., the composite wave A in FIG. 2 assumes a waveform as shown in FIG. 3c, for example.

The received wave A as shown in (c) of FIG. 3, when applied to the amplitude demodulator circuit 7, is supplied first to an envelope detection circuit including a diode 7a, a resistor 7b and a capacitor 7c, where upon detection of the envelope from the received wave A, the subcarrier B is detected. The frequency of the subcarrier B (the subcarrier observed at the junction point between the cathode of the diode 7a, the terminal of the resistor 7b not grounded and the terminal of the capacitor 7c not grounded) output from the envelope detector circuit is the difference between the frequency of the power carrier f1 and the frequency of the data carrier f2, i.e., one-fourth the frequency of the power carrier. The subcarrier B thus assumes a waveform as shown in (c) of FIG. 3, for example.

In the case of PSK modulation, the phase of the data carrier f2 changes with the data. Since the power carrier f1 is not modulated, the phase of the subcarrier B changes with the phase of the data carrier f2. This indicates that the subcarrier B is said to be a PSK-modulated wave obtained by extracting the amplitude change of the power carrier f1.

The subcarrier B output from the envelope detector circuit is applied through a resistor 7e to a non-inverted input terminal of an operational amplifier. 7d on the one hand and also to an inverted input terminal of the operational amplifier 7d through a low-pass filter including a resistor 7f and a capacitor g. The output of the operational amplifier 7d, on the other hand, is positively fed back through a resistor 7h.

The low-pass filter is for determining an average E of the amplitude of the subcarrier B.

In the comparator circuit of this configuration, the amplitude of the frequency component of the difference between the power carrier f1 and the data carrier f2, i.e., the amplitude of the subcarrier B of a frequency one-fourth that of the power carrier f1, is compared with the amplitude average value E thereby to detect the amplitude change of the power carrier f1.

The clock extraction circuit 8 is supplied with the received wave A as shown in (c) of FIG. 3, which is applied to the gate terminal of a transistor 8a. The source terminal of the transistor 8a is grounded, and the drain terminal thereof is connected to a predetermined voltage. The output from the drain terminal of the transistor 8a is connected to the input terminal of an inverter circuit 8c. As a result, a system clock signal D ((e) of FIG. 3) equal to the frequency of the power carrier f1 is output from the output terminal of the inverter circuit 8c.

Now, the amplitude of the received wave A considerably changes with the frequency of the power carrier f1, and so does the amplitude of the subcarrier B with the frequency of the power carrier f1. This sometimes makes it difficult to retrieve the subcarrier B unless the frequencies of the subcarrier B and the power carrier f1 are a sufficient distance from each other. In other words, in (c) of FIG. 3, the subcarrier B assumes a value smaller than the average E under the effect of the power carrier f1 in spite of the fact that it assumes a normal data value at point x or y. At point x and y, therefore, the demodulation operation leads to an operating error. On the other hand, no operating error occurs at point z, etc. where the adverse effect of the power carrier f1 is small.

In order to remove the effect of the power carrier f1, a flip-flop circuit 20 detects an amplitude change point of the power carrier f1 by comparing the amplitude of the subcarrier B with the average thereof at a timing of the system clock signal D in phase with the frequency of the power carrier f1, i.e., at a period in phase with the power carrier. In this way, the data can be demodulated by the comparison process at a timing free of the effect of the power carrier f1.

As a consequence, the flip-flop circuit 20 (C on FIG. 2) can produce a received data C (received modulated data) PSK-modulated which turns on and off with the change of the data, as shown in (e) of FIG. 3. The intensity of the subcarrier B is determined from the ratio between the amplitude of the power carrier f1 and the amplitude of the data carrier f2. In the case where the amplitude demodulator circuit 7 is configured as shown in FIG. 2, however, the amplitude change of the power carrier with the data change can be easily detected even when the intensity of the data carrier f2 is 1/10 or less the intensity of the power carrier f1, for example.

The received modulated data C output from the amplitude demodulator circuit 7 is applied to the demodulator circuit 9.

Now, the operation of the essential parts of the IC card P at the time of transmitting data from the IC card P to the card reader-writer 1 will be explained with reference to the waveform diagram of FIG. 4.

The data H ((b) of FIG. 4) transmitted from the IC card P to the card reader-writer 1 is applied to the modulator circuit 12 under the control of the CPU 10.

The modulator circuit 12 is supplied with a frequency signal obtained by dividing the system clock signal D at a predetermined dividing ratio (¼) in the frequency divider 13 in such a manner that the system clock signal D has the same frequency as the period of the subcarrier B. The transmission data H is phase-modulated at 180° with this frequency. As a result, a modulated transmission data as shown in (c) of FIG. 4 is obtained. On the basis of this modulated transmission data, the load current of the resonator circuit including the antenna coil 4 and the capacitor 5 is controlled ((d) of FIG. 4) in such a manner as to change at a period of the subcarrier one fourth that of the power carrier ((a) of FIG. 4). Then, the radio wave of the same frequency component as the data carrier f2 is generated from the antenna coil 4.

When this radio wave is received by the data transmission-receiving antenna 1B of the card reader-writer 1, the power carrier f1 is output in the form amplitude-modulated by the subcarrier B of the transmission data H. In the case where the subcarrier B is extracted by the same process as in the amplitude demodulator circuit 7 of the IC card P and the data is demodulated from the subcarrier B, on the other hand, the transmission data from the IC card can easily be received as in the preceding case.

As explained above, according to this embodiment, the power carrier f1 and the data carrier f2 having different frequencies are received by a single antenna coil 4 at the same time, and the received wave A is rectified by the rectifier circuit 6 thereby to supply the DC voltage F. At the same time, the amplitude demodulator circuit 7 detects the subcarrier B representing the amplitude variations of the power carrier extracted at the period of a frequency equal to the difference between the two carriers from the received wave. The amplitude of the subcarrier B is compared with the average amplitude E of the subcarrier at a period D (timing of the system clock signal) in phase with the power carrier. The amplitude change point of the power carrier thus is detected thereby to output the received modulated data C. This modulated data C is demodulated to produce the received data. As a result, the data can be transmitted and received in stable fashion by the data carrier without any filter large in attenuation for removing the effect of the power carrier from the data carrier even in the case where the frequencies of the two carrier waves are proximate to each other.

Also, when detecting the amplitude change point of the power carrier, the result of comparison made between the amplitude of the subcarrier B and the average amplitude E thereof at a timing synchronous with the power carrier f1 is output as a received modulated data. In this way, the effect of the power carrier is reduced, so that stable data transmission and reception become possible even in the case where the data change is sufficiently small as compared with the intensity of the power carrier or even in the case where the frequencies of the two carrier waves are proximate to each other.

Although the embodiment described above refers to the case in which the envelope of the received wave is detected to detect the subcarrier and the subcarrier frequency is equal to the frequency difference between the power carrier and the data carrier, the invention is not limited to such a case, but the sum frequency of the two carrier waves may be used instead. In this case, a different circuit is used for detecting the subcarrier in the amplitude demodulator circuit 7. The amplitude change of the power carrier is detected from the detected subcarrier, however, on the same principle as in the above-mentioned embodiment.

The embodiment described above refers to the case of PSK-modulation. Instead, the principle is the same for the ASK or FSK modulation, except for the modulation-demodulation operation.

It will thus be understood from the foregoing description that according to the present invention, there is provided a wireless communication data storing medium and a wireless communication data transmission method, in which the data C can be transmitted and received in stable fashion even when the power carrier f1 and the data carrier f2 are received at the same time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A wireless communication data storing medium comprising:
   means for receiving a composite wave including a first carrier for supplying a source voltage and a second carrier for transferring data;
   means for generating the source voltage by rectifying the composite wave and supplying the source voltage to internal circuits of the wireless communication data storing medium;
   means for detecting an envelope of the composite wave and an amplitude change of the detected envelope corresponding to the data transferred by the second carrier, wherein the detecting means includes second detecting means for comparing a second amplitude of a subcarrier based on an envelope of the composite wave with an average amplitude of the subcarrier in synchronism with the first carrier, and detecting the amplitude change corresponding to the data in accordance with a result of the comparison; and
   means for extracting the data based on the amplitude change of the envelope detected by the detecting means.

2. A wireless communication data storing medium according to claim 1, wherein the detecting means includes
   means for generating a clock signal of a same frequency as the first carrier.

3. A wireless communication data storing medium comprising:
   means for receiving a composite wave including a first carrier for supplying a source voltage and a second carrier for transferring data;
   means for generating the source voltage by rectifying the composite wave and supplying the source voltage to internal circuits of the wireless communication data storing medium;
   means for detecting an envelope of the composite wave and an amplitude change of the detected envelope corresponding to the data transferred by the second carrier, wherein the detecting means includes
   second detecting means for detecting the amplitude change corresponding to the data based on the comparison between the amplitude change of the envelope of the composite wave and an average amplitude of the envelope; and
   means for extracting the data based on the amplitude change of the envelope detected by the detecting means.

4. A wireless communication data storing medium according to claim 3, wherein the second detecting means includes
   means for outputting the envelope based on a difference between the first carrier and the second carrier.

5. A wireless communication data storing medium according to claim 3, wherein the second detecting means includes
   means for outputting the envelope having a frequency one fourth that of the first carrier.

6. A wireless communication data storing medium comprising:
   means for receiving a composite wave including a first carrier for supplying a source voltage and a second carrier for transferring data;
   means for generating the source voltage by rectifying the composite wave and supplying the source voltage to internal circuits of the wireless communication data storing medium;
   means for detecting an envelope of the composite wave and an amplitude change of the detected envelope corresponding to the data transferred by the second carrier;
   means for extracting the data based on the amplitude change of the envelope detected by the detecting means; and
   means for generating a radio wave of the transmission data by modulating a frequency signal in phase with the first carrier according to the transmission data.

7. A wireless communication data storing medium according to claim 6, wherein the generating means includes
   means for dividing the frequency signal at a predetermined dividing ratio so as to adjust the frequency signal to a frequency of the envelope.

8. A data receiving method for a wireless communication data storing medium comprising the steps of:
   receiving a composite wave including a first carrier for supplying a source voltage and a second carrier for transferring data;
   generating the source voltage by rectifying the composite wave and supplying the source voltage to internal circuits of the wireless communication data storing medium;
   detecting an envelope of the composite wave and an amplitude change of the detected envelope corresponding to the data transferred by the second carrier, wherein the detecting step includes comparing the amplitude change of the envelope of the composite wave with an average amplitude of the envelope in synchronism with the first carrier, and detecting the amplitude change corresponding to the data in accordance with a result of the comparison; and
   extracting the data based on the amplitude change of the envelope detected by the detecting step.

9. A data receiving method according to claim 8, wherein the detecting step includes the step of
   generating a clock signal of a same frequency as the first carrier.

10. A data receiving method according to claim 8, wherein the detecting step includes the second detecting step of
    detecting the amplitude change corresponding to the data based on the comparison between the amplitude change of the envelope of the composite wave and an average amplitude of the subcarrier envelope.

11. A data receiving method for a wireless communication data storing medium comprising the steps of:
    receiving a composite wave including a first carrier for supplying a source voltage and a second carrier for transferring data;
    generating the source voltage by rectifying the composite wave and supplying the source voltage to internal circuits of the wireless communication data storing medium;
    detecting an envelope of the composite wave and an amplitude change of the detected envelope corresponding to the data transferred by the second carrier, wherein the second detecting step includes the step of outputting the envelope based on a difference between the first carrier and the second carrier; and
    extracting the data based on the amplitude change of the envelope detected by the detecting step.

12. A data receiving method according to claim 11, wherein the second detecting step includes the step of
    outputting the envelope having a frequency one fourth that of the first carrier.

13. A data receiving method for a wireless communication data storing medium comprising the steps of:
    receiving a composite wave including a first carrier for supplying a source voltage and a second carrier for transferring data;
    generating the source voltage by rectifying the composite wave and supplying the source voltage to internal circuits of the wireless communication data storing medium;
    detecting an envelope of the composite wave and an amplitude change of the detected envelope corresponding to the data transferred by the second carrier;
    extracting the data based on the amplitude change of the envelope detected by the detecting step; and
    transmitting a radio wave of the transmission data by modulating the frequency signal in phase with the first carrier in accordance with the transmission data.

14. A data receiving method according to claim 13, wherein the generating step includes the step of
    dividing the frequency signal at a predetermined dividing ratio so as to adjust the frequency signal to a frequency of the first envelope.

* * * * *